June 9, 1931.                P. H. LINT                1,808,928
                        FRUIT GATHERING MACHINE
                          Filed July 6, 1927
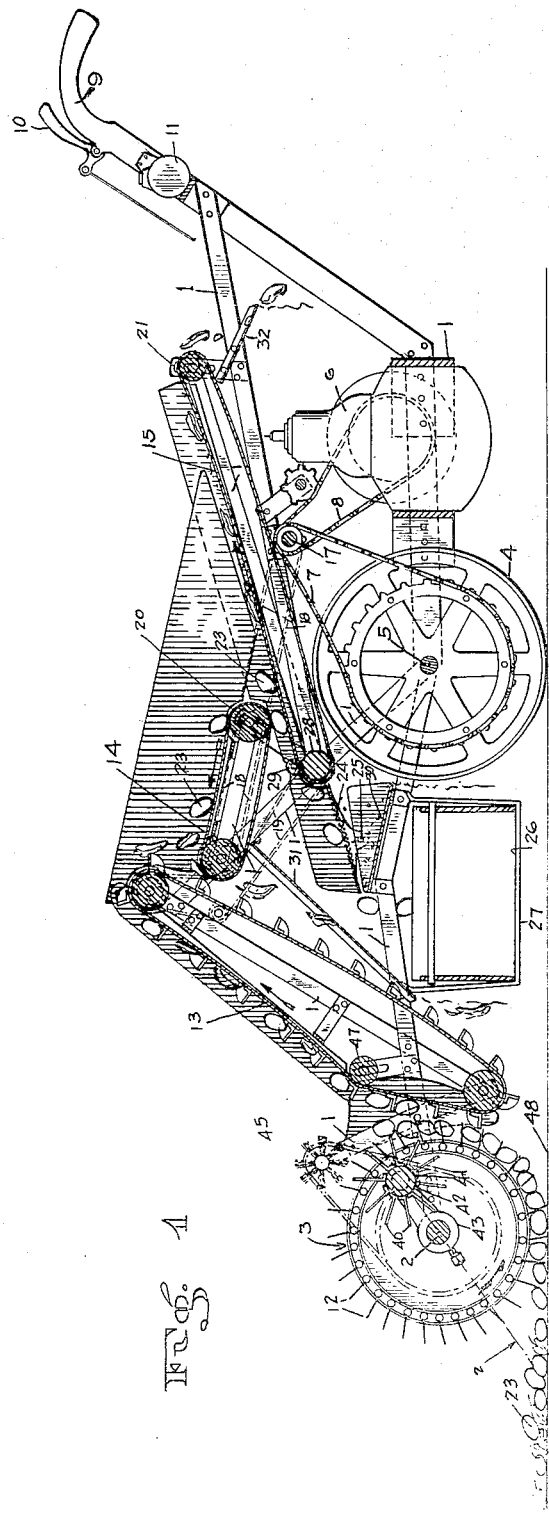
INVENTOR.
Peter H. Lint
BY Miller & Boyken
ATTORNEYS.

Patented June 9, 1931

1,808,928

UNITED STATES PATENT OFFICE

PETER H. LINT, OF SAN JOSE, CALIFORNIA

FRUIT GATHERING MACHINE

Application filed July 6, 1927. Serial No. 203,737.

This invention relates to fruit gathering machines and in particular to such a machine as will gather prunes and other fruit from the surface of the earth beneath the trees.

The objects of the invention are to provide improvements over earlier machines patented by me including those shown in Patents #1,317,927 and #1,476,207, whereby the machine is more effective, its construction simpler and sturdier in many respects, and which is power driven and easier to operate.

In the drawings accompanying this application Fig. 1 is a longitudinal vertical section of my improved machine showing all of its essential parts some well understood details of construction being omitted for the sake of simplicity of the drawings.

Fig. 2 is an enlarged sectional view of the picker drum as seen from the arrow 2 of Fig. 1, and Fig. 3 is a fragmentary enlarged portion of one of the intermediate drum flanges showing in section one of the tubes with impaling pin in position, all as seen from the line 3—3 of Fig. 2.

In detail the machine comprises a suitable frame 1 supporting at its forward end a fixed transverse shaft 2 upon which is revolvably mounted a picker of fruit impaling drum generally designated 3, and rearwardly a single traction wheel 4 mounted on a shaft 5 and driven from a gasoline engine 6 by means of suitable chain drives as indicated at 7 and 8 extending to a countershaft 17.

At the extreme rear the frame is provided with a pair of plow-like handles 9 adapted for holding by an operative for guiding the machine around the ground and tipping the machine as a whole on axis 5 by pressing downwardly on handles 9, the weight of the entire machine being slightly overbalanced forwardly on axis 5. On the handles are suitable control grips (one only being shown) as at 10 for controlling the usual throttle and clutch of the engine (not shown), while at an elevated position on the handles is supported the engine gasoline supply tank 11.

The picker drum (in this instance) is not power driven, although it may be if certain soil conditions require it but is provided with series of fruit impaling pins 12 and gets its motion through rolling upon the ground as the machine is advanced by the engine.

Positioned to the rear of the picker drum 3 is an elevator 13 which elevates the gathered fruit and deposits it on an angularly positioned draper belt 14 moving upwardly but down which the fruit rolls to a second draper belt 15 extending at a reverse angle and traveling upwardly.

Both these drapers are driven by suitable drums from the engine and here indicated by the dotted lines at 18—19 passing over suitable sprockets and idlers and receiving power from the countershaft 17.

The drapers are both pivotally mounted at their driven ends and their opposite ends provided with means as at 20—21 for varying the angle of inclination of the belts and are vertically spaced so that the fruit 23 rolling from belt 14 will roll in a reverse direction under this belt when it strikes belt 15, while at the power end of belt 15 is a short section of screen plate 24 pivoted at 25 for vertical oscillation and placed to permit the fruit from draper 15 to roll over it and fall into a receiving box 26 slidably supported in a shelf 27 suspended from the frame of the machine.

The driving roll of draper 15 is a polyogonal roll 28 so as to cause a wave like motion of this belt to thereby loosen leaves and dirt from the fruit and also serves to keep the fruit rolling while the screen 24 is over balanced rearwardly of its pivots and provided with a roller as at 29 bearing on a part of the polygonal roll so as to oscillate the screen, while beneath the screen is a suitable chute 30 for discharging any finally loosened dirt to the ground.

Similar chutes are positioned under the upper ends of the drapers 14 and 15 as indicated at 31 and 32.

The picker or impaling drum 3 comprises end flanges or heads 33 and spaced intermediate flanges or rings 34 supporting transversely arranged tubes 35 to which the pins 12 are secured as best shown in Fig. 3, the pins passing through one wall of the tube and being shouldered and riveted to the other side as indicated at 36.

Aligned holes are formed in the flanges and heads through which the tubes pass and they are bolted at 37 to the laterally extending flanges of the heads, the bolts passing through inner rings 38.

The intermediate flanges 34 are slotted at 39 so that the tubes 35 assembled with pins may be pushed into place, and if desired any of the tubes can be removed without removing the heads 33 by simply removing the bolts 37 and sliding the tube bodily one way to clear the other end from the laterally projecting head flange, then springing the tube outward over the same and withdrawing the small diameter tubes, their material and treatment permitting this.

The pins are so spaced and arranged at an angle to radial lines as to most effectively impale the fruit 23 or hold it between them and carry it rearwardly upward as the machine advances, while at the upper rear portion of the drum and within the same is an ejector wheel comprising a set of radially extending flat sheet metal leaves 40 mounted on a hub 41 freely revolvable on a shaft 42 carried in bracket arms 43 rigidly secured to the fixed shaft 2 or to the frame as may be desired.

This ejector wheel is rotated by its flat leaves working between the round tubes 35 in the same manner as an internal gear, in fact the clearances in leaving and entering being so figured as to substantially avoid all backlash and the round tubes cooperating with the flat leaves in effectively overcoming any tendency to jamb or strike adjacent members, and the leaves being solid overcome the prior difficulty of engaging rocks and fruit as the ejecting members withdraw. Also the leaves are slotted at 44 to pass the intermediate flange rings 34 and serve to prevent lateral shifting of the same.

At a point just above the rotating ejector wheel is a rotary brush 45 preferably of spiral tine arrangement and adapted to brush off the pins to rid them of any impaled matter not ejected by the ejector leaves.

This brush is preferably mounted on suitable extensions of the frame as indicated and is driven in direction of the arrow by means of a chain to the drum as indicated at 46.

The elevator 13 is preferably a belt and cleat elevator as indicated and it passes over an intermediate adjustable guiding roll 47 so as to conform its lower portion more against the rear side of the impaling drum than would otherwise be possible with the angle shown.

In the construction described as stated there is a small preponderance of weight of the machine forward of pivot 5 so that the impaling drum will rest rather lightly upon the ground 48 thus avoiding injury to the fruit, and it may easily be lifted entirely from the ground by a light pressure upon the handles 9. Also since the single control driving wheel 4 is relatively narrow it gives with the long drum a three point support on the ground, and when the machine is tilted it may be turned with utmost facility.

In operation, the surface of the ground is first prepared by flattening it before the fruit falls, and when sufficient fruit has fallen or has been shaken down the machine is guided over the fallen fruit so that it is impaled and carried to the ejector, thence to the elevator, down against the ascending surfaces of the drapers, over the oscillating screen, and into the box. The drapers having an opposite movement to that of the rolling fruit carry away the leaves, stones and dirt not round enough to roll on the incline of the drapers, their angles being adjusted to just the point where the fruit itself will roll properly.

I claim:

1. A fruit gathering machine comprising a frame, a rotatable fruit impaling drum mounted at the forward end thereof adapted to roll upon the ground, and a single supporting ground wheel cooperating with said drum spaced rearwardly therefrom, conveyor and draper means mounted on said frame arranged to carry fruit from said impaling drum, and a receiver into which said fruit is discharged, a small preponderance only of the weight of the machine being forwardly overbalanced with respect to the axis of said ground wheel and a guiding handle at the rear end of the frame for guiding the machine.

2. A fruit gathering machine comprising a frame, a rotatable fruit impaling drum mounted at the forward end thereof adapted to roll upon the ground, and a single supporting ground wheel cooperating with said drum spaced rearwardly and centrally with relation to said drum therefrom, conveyor and draper means mounted on said frame arranged to carry fruit from said impaling drum, and a receiver into which said fruit is discharged.

3. A fruit gathering machine comprising a frame, a fruit impaling drum rotatably mounted at the forward end thereof adapted to roll upon the ground, a rearwardly positioned ground wheel on said frame cooperating with said drum, a rearwardly inclined upwardly movable elevator adjacent the rear side of said drum, means for ejecting fruit from said impaling drum to said elevator, a downwardly inclined upwardly movable draper arranged to receive the fruit from said elevator, a second inclined draper beneath the first draper arranged to receive the fruit therefrom means for driving the elevator and both drapers upwardly, and a receptacle for receiving the fruit mounted on said frame.

4. A fruit gathering machine comprising a frame, a fruit impaling drum rotatably mounted at the forward end thereof adapted to roll upon the ground, a rearwardly positioned ground wheel on said frame cooperating with said drum, a rearwardly inclined upwardly movable elevator adjacent the rear side of said drum, means for ejecting fruit from said impaling drum to said elevator, a downwardly inclined upwardly movable draper arranged to receive the fruit from said elevator, a second inclined draper beneath the first draper arranged to receive the fruit therefrom, means for driving the elevator and both drapers upwardly, a screen pivotally mounted adjacent the end of one of the drapers for passing over of the fruit, and means for agitating said screen.

5. In a fruit gathering machine of the character described, a fruit impaling drum provided with spaced pins supported and projecting from its periphery an internal rotary ejector mounted within said drum comprising a hub with radially arranged plates thereon in gear-like engagement with the supports for said pins adapted upon rotation to eject impaled fruit from said pins.

6. In a fruit gathering machine of the character described, a fruit impaling drum provided with spaced pins supported and projecting from its periphery an internal rotary ejector mounted within said drum comprising a hub with radially arranged plates thereon in gear-like engagement with the supports for said pins adapted upon rotation to eject impaled fruit from said pins the supports for said pins comprising transversely arranged bar-like members extending between the ends of the drum and from which members the pins project.

7. In a fruit gathering machine of the character described, a fruit impaling drum comprising end flanges, bar-like members spaced around the periphery of said end flanges and secured thereto, and intermediate flanges spaced between said end flanges, the bar-like members passing through holes in the intermediate flanges slotted for passage of the pins, whereby the pin-supports assembled with pins may be placed in position.

8. In a structure as specified in claim 5 said drum provided with a flange intermediate its ends and the plates of said ejector being slotted to pass said flange.

9. In a fruit gathering machine of the character described, a fruit impaling drum comprising end flanges, spaced tubes extending transversely of the drum secured to said flanges and pins projecting from said tubes, the pins passing one wall of the tube and being shouldered and secured thereat to the opposite wall of the tube.

10. A fruit gathering machine comprising a frame, a fruit impaling drum rotatably mounted at the forward end thereof adapted to roll upon the ground, a rearwardly positioned ground wheel on said frame cooperating with said drum, a rearwardly inclined upwardly movable elevator adjacent the rear side of said drum, means for ejecting fruit from said impaling drum to said elevator, a receiver into which the fruit is discharged and a guide roller secured to the frame and extending transversely of said elevator and contacting thereagainst at a point intermediate of its ends, said guide roller arranged and adapted to conform a portion of the elevator against the rear side of said impaling drum.

PETER H. LINT.